UNITED STATES PATENT OFFICE.

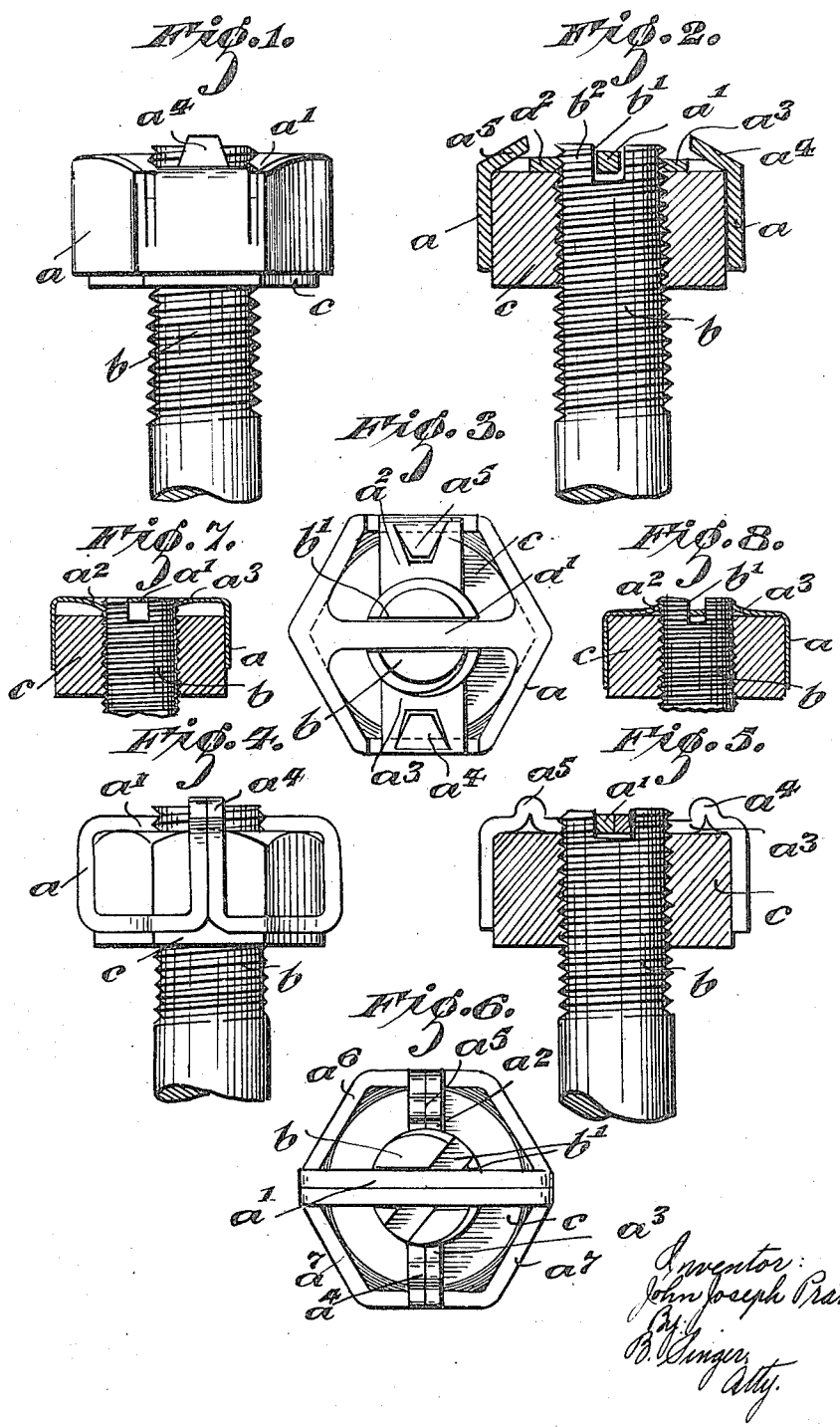

JOHN J. PRATT, OF BIRMINGHAM, ENGLAND, ASSIGNOR OF ONE-HALF TO EDWARD MUDDYMAN, JR., OF BIRMINGHAM, ENGLAND.

LOCK-NUT.

1,261,288. Specification of Letters Patent. Patented Apr. 2, 1918.

Application filed August 29, 1916. Serial No. 117,504.

*To all whom it may concern:*

Be it known that I, JOHN JOSEPH PRATT, a subject of the Kingdom of Great Britain, residing at 4, back of 40, New Spring street, Birmingham, in the county of Warwick, England, fitter and turner, have invented certain new and useful Improvements Relating to Lock-Nuts, of which the following is a specification.

My invention comprises improvements relating to lock nuts and has for its object to provide simple means whereby a nut may be held in place with the same security as a castellated nut and cotter pin, my appliance however being much cheaper to manufacture and to fit.

According to this invention I provide a cap for fitting over the nut, the said cap having a part which engages with a slot or equivalent in the bolt or other part upon which the nut is to be secured so as to prevent rotation of the cap and nut relatively to the bolt, in combination with means for preventing displacement of the cap in a direction corresponding with the length of the bolt.

In order that this invention may be clearly understood and readily carried into practice, reference may be had to the appended sheet of explanatory drawings upon which:—

Figure 1 is an elevation of a nut and bolt with a cap in position.

Fig. 2 is a part section through Fig. 1, showing the bolt in elevation.

Fig. 3 is a plan of Fig. 1.

Fig. 4 is a similar view to Fig. 1, but showing a modified form of cap.

Fig. 5 is a part section through Fig. 4 showing the bolt in elevation.

Fig. 6 is a plan of Fig. 4.

Fig. 7 is a similar section to Fig. 2, but illustrating another means for securing and removing the cap in a direction corresponding with the length of the bolt.

Fig. 8 is a similar section to that of Fig. 7, illustrating the operation of securing the cap in position or removing same.

In an embodiment of this invention the cap $a$ is preferably made from sheet steel pressed so as to fit over the nut $c$ to be secured, the upper portion of the cap being cut away so as to provide a transversely disposed central member or bar $a^1$ which is adapted to fit within a slot $b^1$ cut across the end of the bolt $b$ so that when the cap $a$ (which is of hexagonal or other shape to correspond with the nut) is in place the bar $a^1$ fits within the slot $b^1$ and thus positively prevents both the cap $a$ and the nut $c$ from rotating relatively to the bolt $b$. Or the bolt $b$ may have a simple groove or grooves and the cap be provided with an internal projection forming the equivalent of the bar $a^1$.

The cap $a$ is placed in position by a movement in the direction of the length of the bolt and as the cap $a$ fits upon the nut $c$ and the transverse bar $a^1$ of the cap is fitted within the slot $b^1$, so long as the cap $a$ is in place the nut $b$ cannot rotate and the cap $a$ can only be disengaged by longitudinal movement. Means are provided for preventing this longitudinal movement which means preferably comprise a pair of spring gripping members $a^2$, $a^3$, formed in one with the top of the cap $a$ and which spring into engagement with the threads $b^2$ upon the bolt $b$ when the cap is forced longitudinally into place, after which the cap cannot be withdrawn until the gripping members $a^2$, $a^3$ have been pressed outwardly. To enable this to be done the gripping members $a^2$, $a^3$ may be provided with projections $a^4$, $a^5$, whereby they can be pressed apart with the aid of a pair of pliers or like tools and the cap $a$ withdrawn.

In place of the cap $a$ being formed from sheet steel it may be formed from steel wire as illustrated in Figs. 4, 5 and 6, in which case it may be formed of two lengths of wires $a^6$ and $a^7$ bent as shown, the center portions of each part being welded together to form the bar $a^1$, while the respective ends of each part are also welded together and flattened at the edge to respectively form the spring gripping members $a^2$, $a^3$, the spring grips being also bent up at $a^4$, $a^5$ to form projections for enabling the gripping members to be forced apart for the purpose of withdrawing the cap.

In place of the projections $a^4$, $a^5$, the gripping members $a^2$, $a^3$ may be normally formed as shown in Fig. 7, so as to allow of the edges being first engaged with the thread of the bolt, after which the cap is forced on to the nut in the position illustrated by Fig. 8, where it is retained by the spring of the metal of the gripping members, but can be removed when required by the insertion of any tool such as a screw driver forced in between the end of the nut and the gripping members $a^2$, $a^3$ so as to prize it away from the nut in the position illustrated by Fig. 7, from which it can be readily removed.

An additional slot or slots $b^1$ may be arranged in the end of the bolt $b$ as shown in Fig. 6, so as to enable the cap $a^1$ to be attached when the nut is practically in any position in relation to the bolt.

Other means may be provided for preventing the longitudinal displacement so long as they are of a nature which readily admits of the cap being longitudinally displaced when required for the removal of the nut.

It will be obvious that the invention is applicable not only to bolts, but to shafts or members upon which nuts are required to be locked.

What I claim as my invention and desire to secure by Letters Patent is:—

1. A nut lock including a nut, a cap formed so as to correspond to the nut, and being adapted to envelop the same on all sides, such cap being provided with a transversely extending bar and prongs, a screw threaded bolt formed with a groove in its stem adapted to engage said bar, the prongs engaging the threads in the bolt, whereby movement of the cap and consequently the bolt in any direction, with respect to the bolt, is prevented.

2. A nut lock including a nut, a cap formed so as to correspond to and envelop said nut on all sides, a bolt, said cap and bolt being provided with means to prevent rotary movement of the cap with respect to the bolt, and further means comprising prongs, adapted to engage the bolt whereby to prevent longitudinal movement of the cap, such prongs being provided with projections, by means of which the said prongs can be drawn out of engagement with the bolt.

3. A nut lock including a nut, a cap provided with an opening in its crown and being further formed with a bar integral therewith, which extends diametrically across the opening, such cap being further formed with prongs, a screw-threaded bolt formed with a groove in its stem, such groove extending diametrically across the bolt and being adapted to engage said bar, the prongs engaging the thread in the bolt, whereby movement of the cap and consequently the bolt in any direction with respect to the bolt is prevented.

In witness whereof I have hereunto set my hand.

JOHN J. PRATT.